(12) United States Patent
Wilkes et al.

(10) Patent No.: US 9,185,112 B2
(45) Date of Patent: Nov. 10, 2015

(54) EXTENSIBLE CONFIGURATION SYSTEM TO ALLOW A WEBSITE TO AUTHENTICATE USERS BASED ON AN AUTHORIZATION PROTOCOL

(71) Applicant: Adobe Systems Incorporated, San Jose, CA (US)

(72) Inventors: Ryan Wilkes, San Francisco, CA (US); Lars Trieloff, Potsdam (DE); Felix Meschberger, Niederdorf (CH); Tyson Norris, Oakland, CA (US); Pankil Doshi, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/648,825

(22) Filed: Oct. 10, 2012

(65) Prior Publication Data

US 2014/0101723 A1    Apr. 10, 2014

(51) Int. Cl.
    G06F 21/31    (2013.01)
    H04L 29/06   (2006.01)
    G06Q 30/06   (2012.01)
    G06F 21/00   (2013.01)

(52) U.S. Cl.
    CPC ............ *H04L 63/0884* (2013.01); *G06F 21/00* (2013.01); *G06Q 30/0629* (2013.01)

(58) Field of Classification Search
    None
    See application file for complete search history.

(56) References Cited

U.S. PATENT DOCUMENTS

| | | | |
|---|---|---|---|
| 7,359,894 B1 | 4/2008 | Liebman et al. | |
| 7,756,895 B1 | 7/2010 | Emigh | |
| 7,860,889 B1 | 12/2010 | Martino et al. | |
| 8,027,931 B2 | 9/2011 | Kalaboukis | |
| 8,063,312 B2 | 11/2011 | Ooyabu et al. | |
| 8,161,059 B2 | 4/2012 | Guo et al. | |
| 2002/0069261 A1 | 6/2002 | Bellare et al. | |
| 2007/0150603 A1 | 6/2007 | Crull et al. | |
| 2010/0169324 A1 | 7/2010 | Shnitko et al. | |
| 2010/0250341 A1 | 9/2010 | Hauser | |
| 2011/0225048 A1 | 9/2011 | Nair | |
| 2012/0072717 A1 | 3/2012 | Hayes | |
| 2012/0158539 A1* | 6/2012 | Lawrence et al. | 705/26.8 |
| 2012/0166274 A1 | 6/2012 | Krishnamoorthy | |
| 2012/0192258 A1 | 7/2012 | Spencer et al. | |
| 2012/0233212 A1 | 9/2012 | Newton et al. | |
| 2013/0046839 A1 | 2/2013 | Ransom et al. | |
| 2013/0067081 A1 | 3/2013 | Liu et al. | |
| 2013/0144663 A1* | 6/2013 | Qawami et al. | 705/5 |
| 2014/0012663 A1 | 1/2014 | Ransom et al. | |
| 2014/0075018 A1 | 3/2014 | Maycotte et al. | |

OTHER PUBLICATIONS

Non Final Office Action in related U.S. Appl. No. 13/648,856, dated Feb. 24, 2014, 10 pages.

(Continued)

*Primary Examiner* — Gilberto Barron, Jr.
*Assistant Examiner* — Simon Kanaan
(74) *Attorney, Agent, or Firm* — Kilpatrick Townsend & Stockton LLP

(57) ABSTRACT

An extensible configuration system to allow a website to authenticate users based on an authorization protocol is disclosed. In some embodiments, the extensible configuration system includes receiving an identifier for an authentication provider; and automatically configuring a website to use the authentication provider for logging into the website.

20 Claims, 16 Drawing Sheets

(56) References Cited

OTHER PUBLICATIONS

Non Final Office Action in related U.S. Appl. No. 13/648,856, dated Dec. 9, 2014, 10 pages.

Final Office Action in related U.S. Appl. No. 13/648,856, dated Jun. 3, 2015, 14 pages.

* cited by examiner

EXTENSIBLE CONFIGURATION SYSTEM TO ALLOW A WEBSITE TO AUTHENTICATE USERS BASED ON AN AUTHORIZATION PROTOCOL

BACKGROUND OF THE INVENTION

Various services such as Facebook®, Twitter®, Linkedin®, and others expose service APIs that adhere to various authentication protocols (e.g., OAuth 1.0/2.0, etc.) so that external websites or applications may use such "trusted" services as sources of authorization and authentication (in lieu of, or in addition to, their own internal authentication mechanisms).

BRIEF DESCRIPTION OF THE DRAWINGS

Various embodiments of the invention are disclosed in the following detailed description and the accompanying drawings.

FIG. 5 is a diagram illustrating an embodiment of an interface for generating a Twitter® application.

FIG. 6 is a diagram illustrating an embodiment of an interface for a stabling a new group for social users.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various services such as Facebook®, Twitter®, Linkedin®, and others expose service APIs that adhere to various authentication protocols (e.g., OAuth 1.0/2.0, etc.) so that external websites or applications may use such "trusted" services as sources of authorization and authentication (in lieu of, or in addition to, their own internal authentication mechanisms).

Typically, however, it takes a significant amount of time for a developer of a website to implement and test code for each service that they wish to consume as an authentication source. This can be inconvenient.

Thus, there is a need for an improved system that allows a website to take advantage of "trusted" services.

Accordingly, an extensible configuration system to allow a website to authenticate users based on an authorization protocol is disclosed in accordance with some embodiments.

Figure 1:
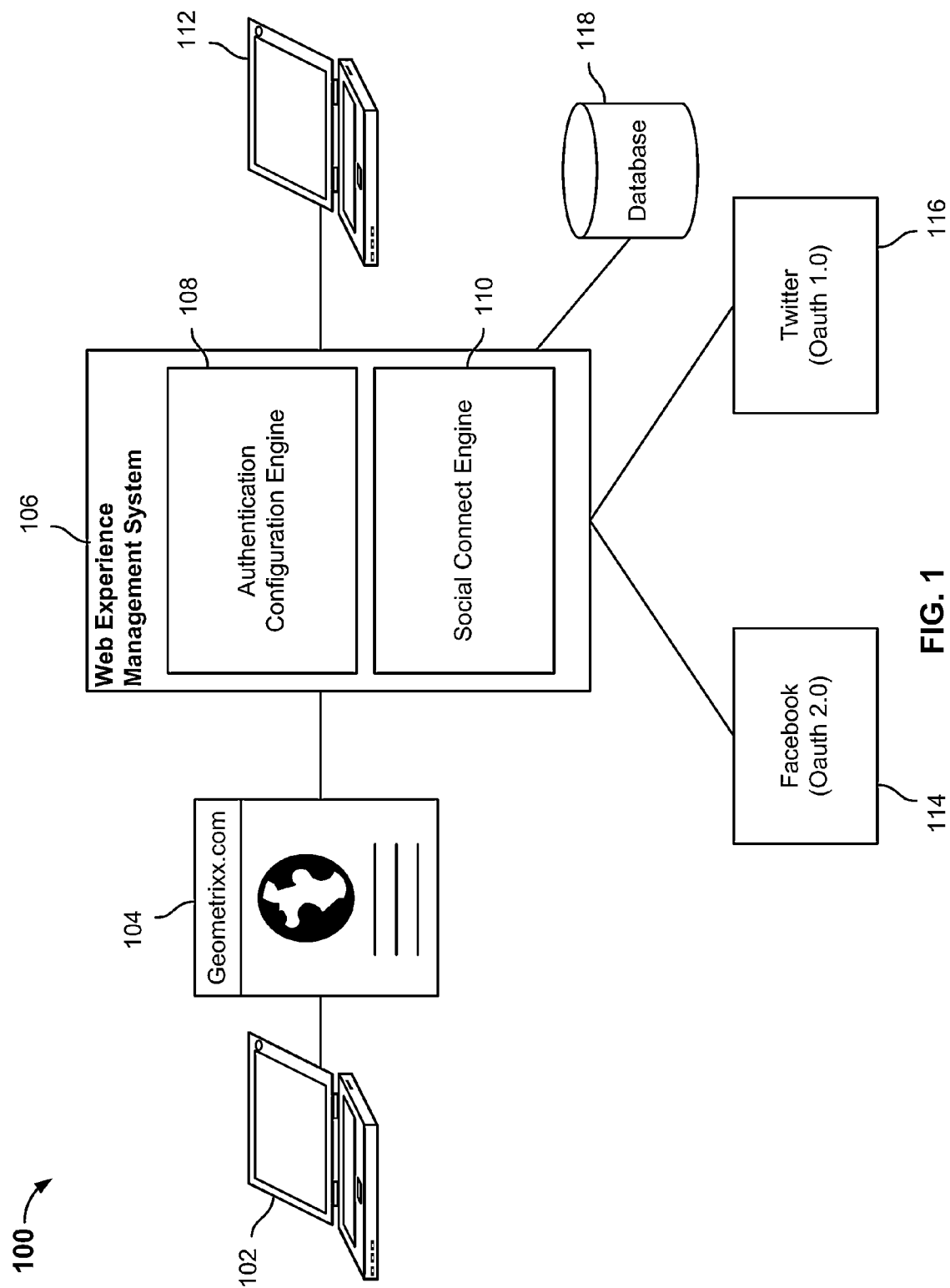
FIG. 1 is a diagram illustrating an embodiment of an environment in which an extensible configuration system to allow a website to authenticate users based on an authentication protocol is used.

FIG. 1 is a diagram illustrating an embodiment of an environment in which an extensible configuration system to allow a website (e.g., an Adobe CQ website) to authenticate users based on an authorization protocol (e.g., the OAuth 1.0 or 2.0 protocol or another authentication protocol) is used. In the example shown, "Bob" (102) is a visitor of the website for the sporting goods store, Geometrixx Outdoors (104), which is published using website experience management (WEM) system (106). In some embodiments, website (104) is an Adobe CQ website and WEM (106) is an Adobe CQ web experience management (WEM) system that is used to author/publish website (104) as well as manage and dynamically determine and deliver personalized content. Website (104) is configured via WEM (106) by administrator (112). In various embodiments, administrator (112) is a website developer, digital marketer, or any other appropriate administrator of website (104). For purposes of illustration, embodiments employing an Adobe CQ web experience management system to author/publish an Adobe CQ website ("Geometrixx Outdoors") are described in detail below. Other WEM systems or publishing/authoring platforms can also be used.

In some embodiments, services 114 and 116 are digital identity platforms that provide authentication services (e.g., via APIs) such that a member of the platform can log onto and be authenticated by external websites (e.g., Adobe CQ website 104) using their existing digital identities. Examples of such digital identity platforms that provide authentication services include Facebook®, Twitter®, Linkedin®, Foursquare®, and others. The digital identity platforms can each be associated with various authentication protocols (e.g., OAuth 1.0/2.0, etc.) so that an external Adobe CQ website (such as Geometrixx Outdoors 104) and WEM 106 can use such "trusted" platforms as sources of authentication and authorization (e.g., of resources of the trusted sites).

In some embodiments, Adobe CQ system 106 includes an authentication configuration engine 108 that is configured to communicate with services 114 and 116 and allows website 104 to authenticate users based on various authentication protocols. This can enable Bob, for example, to log into the Geometrixx Outdoors website (104) using his existing Facebook® and/or Twitter® digital identities (i.e., federated identity or social login). Adobe CQ system 106 can also be authorized (e.g., by Bob) to obtain resources (e.g., social profile data) from each of services 114 and 116 for providing targeted, personalized content (e.g., as part of a marketing campaign) via social connect engine 110. In some embodiments, information associated with Adobe CQ system 106 is stored in storage unit 118. In various embodiments, storage unit 118 can be a database, flat file, or any other appropriate storage unit.

In some embodiments, the authentication and social connect engines are included as pluggable services (e.g., OSGi services) that can be integrated as part of a website development process on Adobe CQ system 106. As the authentication configuration process is integrated into a website publishing system such as Adobe CQ, connecting with authentication providers such as Facebook® and Twitter® can be simplified in a manner that allows an Adobe CQ website (104) to be automatically configured to take advantage of trusted digital identity platforms while minimizing the amount of authentication protocol and coding knowledge (e.g., to handle handshakes, redirects, accessing social profile data, etc.) needed by administrators to implement the authentication and login functionality. Additionally, in some embodiments, other publishing/authoring services such as marketing campaign management services are included on publishing system 106 and are authorized to use information associated with authenticated users that is obtained from digital identity platforms such as services 110 and 112 for providing personalized content to Bob.

In various embodiments, the elements of environment 100 communicate via a network that comprises one or more of a wired network, a wireless network, a local area network, a wide area network, the Internet, or any other appropriate network.

Figure 2:
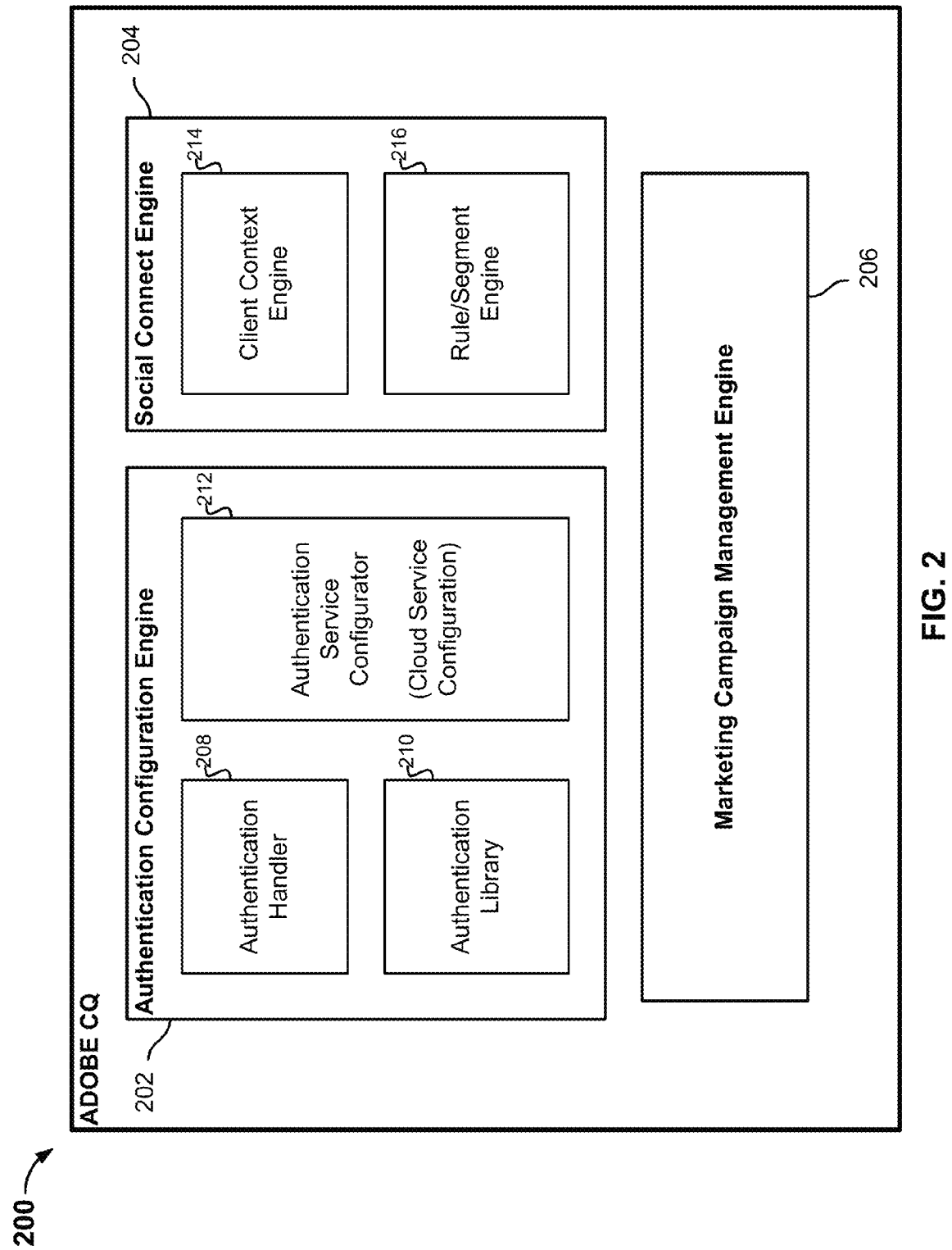
FIG. 2 is a block diagram illustrating an embodiment of a web experience management system.

FIG. 2 is a block diagram illustrating an embodiment of a web experience management system. In some embodiments, system 200 of FIG. 2 is used to implement Adobe CQ system 106 of FIG. 1. In the example shown, Adobe CQ system 200 includes authentication configuration engine 202, social connect engine 204, and marketing campaign management engine 206. In various embodiments, engines 202, 204, and 206 comprise, as described above, pluggable services (e.g., OSGi services) that can be integrated into an Adobe CQ system to communicate with each other as well as other services/components that can also be implemented on the Adobe CQ system.

Authentication configuration engine includes authentication handler 208, authentication library 210, and authentication service configurator 212. In some embodiments, authentication handler 208 includes authentication handlers to handle various authentication workflows (e.g., specialized authentication handlers for OAuth 1.0/2.0, etc.). In some embodiments authentication library 210 includes libraries used to implement various authentication protocols/standards and communicate with various APIs (e.g., APIs for Google®, Yahoo®, Linkedin®, Twitter®, Foursquare®, Facebook®, etc.). In some embodiments, software development kits (SDKs) are also included, which can be used by administrators to configure their Adobe CQ websites as trusted authentication providers. For example, an administrator of Geometrixx Outdoors can allow users to create new digital identities and credentials for Geometrixx Outdoors, which can in turn be used to login to other third party websites.

In some embodiments, authentication service configurator 212 is used to configure services that are used to communicate with various authentication providers (e.g., Facebook®, Twitter®, etc.). In some embodiments, an authentication service is configured for each digital identity platform that an Adobe CQ website (e.g., website 104 of FIG. 1) is configured to communicate with and authenticate users. More than one authentication service can also be configured for a single authentication provider (e.g., that includes different settings/configurations).

The authentication services can be configured to include details of applications created at authentication providers, which will be described in more detail below. In various embodiments, service configurations include permissions to be requested of authenticated users, such as credentials (e.g., username and password), resources which an Adobe CQ website such as Geometrixx Outdoors is authorized to access (e.g., Facebook® likes, interests, profile information, friends, Twitter® feeds, followers, etc.) as well as actions that Geometrixx Outdoors can perform on behalf of the user (e.g., post a status update on behalf of a Facebook® user or a tweet on behalf of a Twitter® user). In some embodiments, authentication service configurations include user groups (e.g. CQ authentication user groups) that a visitor can be grouped into based on the digital identity platform that they have logged into the Adobe CQ website with. The user groups (e.g., CQ user groups) can be used by other components of an Adobe CQ system, such as a marketing campaign management component to provide a personalized web experience. In some embodiments, authentication service configurations are associated with, or otherwise applied to, particular portions of an Adobe CQ website or content management system (such as Adobe CQ). For example, Adobe CQ website 104 of FIG. 1 could include an Italian portion of the website, whose Facebook® authentication service is configured differently to the Facebook® authentication service applied to the French portion of the website. For example, the two services, although both associated with Facebook®, could be configured differently and request authorization for access to different resources due to cultural privacy concerns. Different portions of a website can also be associated with different authentication providers as well. For example, if Geometrixx Outdoors is configured to allow a user to login using their Facebook®, Twitter®, and Linkedin® digital identities, the shopping portion of Geometrixx Outdoors could be allowed to have access to Facebook® and Twitter® social profile data, while a "jobs"

portion of the website could be allowed to have access to a user's Linkedin® social profile data.

Social connect engine 204 includes client context engine 214 and rule/segment engine 216. Social connect engine 204 can be used to allow users to connect to and manage connections with various digital identity platforms. In some embodiments, client context engine 214 is a content management component configured to read authorized user profile data of the digital identities that a user has logged in with (e.g., Facebook®, Twitter® social profile data) to generate a new profile of the user. The user profile data can then be mapped to a segment (i.e., to segment the user) which will be described in more detail below. In some embodiments, determinations of what content to display or rendered to a user are made based at least in part on the segmenting of the user. The information included in the client context can be used by various components (e.g., marketing campaign management component 206) of a WEM such as Adobe CQ to provide a user with targeted, personalized content. In some embodiments, the client context information is stored or otherwise maintained on the side of the user visiting the Adobe CQ website (e.g., within the browser of the visitor).

Rule/segment engine 216 is configured to facilitate the generation of segments and rules based on user profile data obtained from one or more existing digital identities of authenticated users (e.g., social profile data) and allows the segments and rules to be associated with one another to be interpreted by components such as client context engine 214 and marketing campaign management engine 206. In some embodiments, segments are used to segment the user into a particular bucket in order to provide a visitor, such as Bob, with targeted and personalized content that is maintained in the marketing campaign management section of an Adobe CQ system. In some embodiments, segments are collections of one or more rules/traits. In some embodiments, rules are conditions (or traits of interest) associated with obtained information that when matched or triggered on, can be used to provide targeted/personalized content. Examples of rules/traits include "gender=male," "Facebook® like=snow," "Facebook® interest=snowboarding," "Twitter® follower of =Shaun White." Segments can then be generated from defined rules in order to segment a user into a particular bucket that can be associated with candidate content/experiences. Example candidate content/experiences include teasers/paragraphs to be displayed/rendered (e.g., used to steer specific visitor segments to content that is focused on their interests), newsletters, e-mail communications, content used for testing and targeting (e.g., for use by a marketer as a tool to optimize a website to provide more relevant content and offers by designing and executing tests, creating audience segments, targeting content, etc.), or any other appropriate candidate content/experiences. As an example, a segment including the rules "gender=male," "like=formula 1," and "fan of =Ayrton Senna," can be created, and users who match this segment and collection of rules are shown a particular teaser out of a number of candidate teasers associated with various marketing campaigns (e.g., formula 1 racing teaser instead of hiking teaser).

Marketing campaign management engine 206 is an example component of an Adobe CQ system that can take advantage of integration with authentication engine 202 and social connect engine 204 to dynamically determine and deliver targeted and personalized content (e.g., teaser or ad or customized website) to a visitor such as Bob (i.e., in the context of Bob as a visitor) of an Adobe CQ website who has logged into the Adobe CQ website and been authenticated using existing digital identities such as their Facebook® and Twitter® logins and credentials.

Figure 3A:
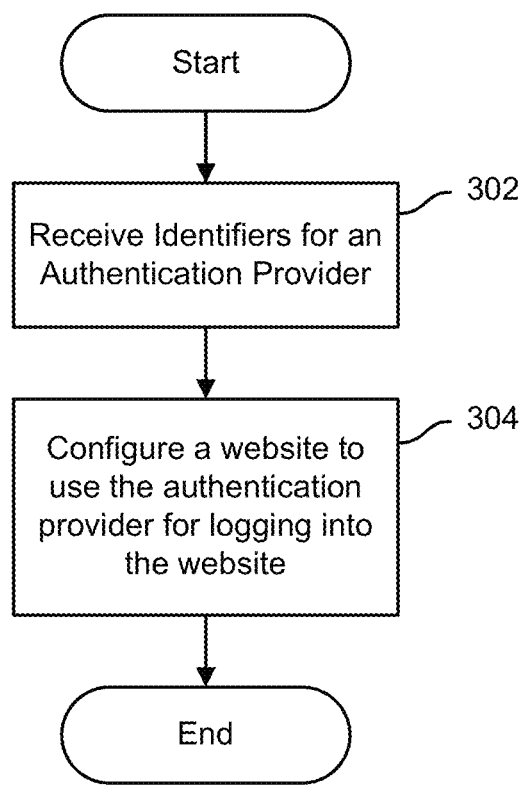
FIG. 3A is a flow diagram illustrating an embodiment of a process for allowing a website to authenticate users based on an authentication protocol.

FIG. 3A is a flow diagram illustrating an embodiment of a process for allowing an Adobe CQ website to authenticate users based on an authentication protocol (e.g., OAuth 1.0/2.0 etc.). In some embodiments, process 300 of FIG. 3 is executed by authentication configuration engine 202 of FIG. 2. The process begins at 302 when identifiers for an authentication provider are received, as will be described in more detail below. At 304, a website is configured to use the authentication provider for logging into the website, as will also be described in more detail below.

Figure 3B:
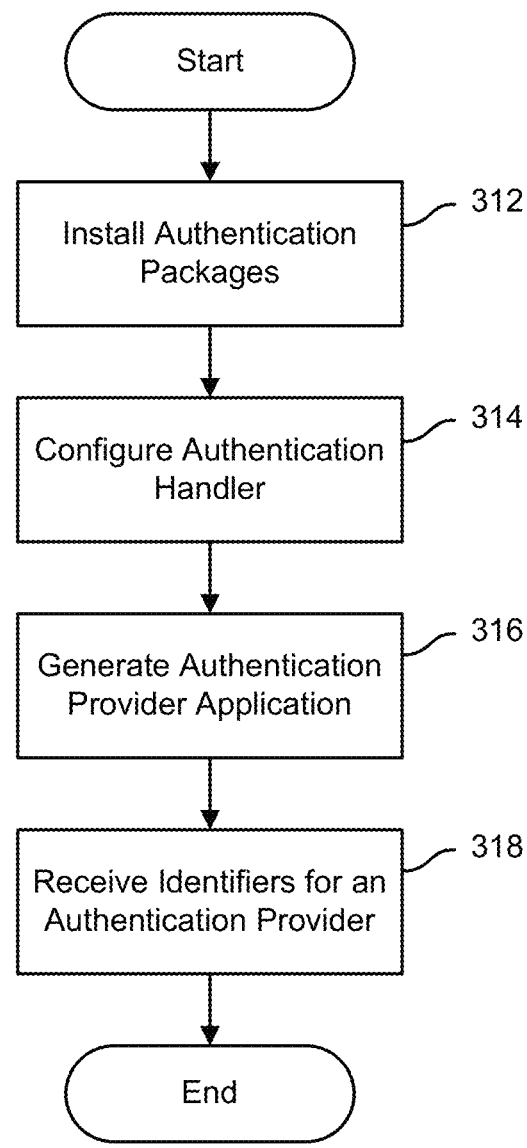
FIG. 3B is a flow diagram illustrating an embodiment of a process for receiving identifiers for an authentication provider.

FIG. 3B is a flow diagram illustrating an embodiment of a process for receiving identifiers for an authentication provider. In some embodiments, process 310 is used to implement process step 302 of FIG. 3A. The process begins at 312 when an authentication package is installed. Packages and code used to implement authentication mechanisms can be installed as a pluggable service (e.g., as pluggable OSGi service) of a web authoring platform (e.g., Adobe CQ). The installed packages can include default packages that are pre-configured to connect with digital identity platforms (e.g., Facebook® or Twitter®) that utilize particular authentication protocols or mechanisms (e.g., OAuth 2.0 or 1.0). The installed packages can also include tools (e.g. SDKs) for developers to configure connections for other digital identity platforms.

At 314, an authentication handler is configured to handle the authentication workflow of an authentication provider (e.g., OAuth 1.0 for Twitter®, OAuth 2.0 for Facebook®, etc.).

At 316, an application associated with an authentication provider (e.g., Facebook®, Twitter®, etc.) is generated. In some embodiments, an application is generated in order to make a Adobe CQ website (e.g., Geometrixx Outdoors) known to the authentication provider so that the Adobe CQ website and the authentication provider are connected to allow for authentication, authorization, and exchange of information between the two entities. For example, a properly configured Facebook® application (e.g., via Facebook® connect) enables Facebook® social login and connection. In some embodiments, a user, such as administrator 112 of FIG. 1 is prompted to generate an application at the authentication provider. In some embodiments, one or more identifiers for the authentication provider, such as keys, are provided in response to generating an application. For example, when generating a Facebook® application, an application id and secret are provided.

At 318, identifiers for an authentication provider are received. For example, keys, such as the application ID and secret described above are obtained in response to generating an application associated with an authentication provider.

Figure 3C:
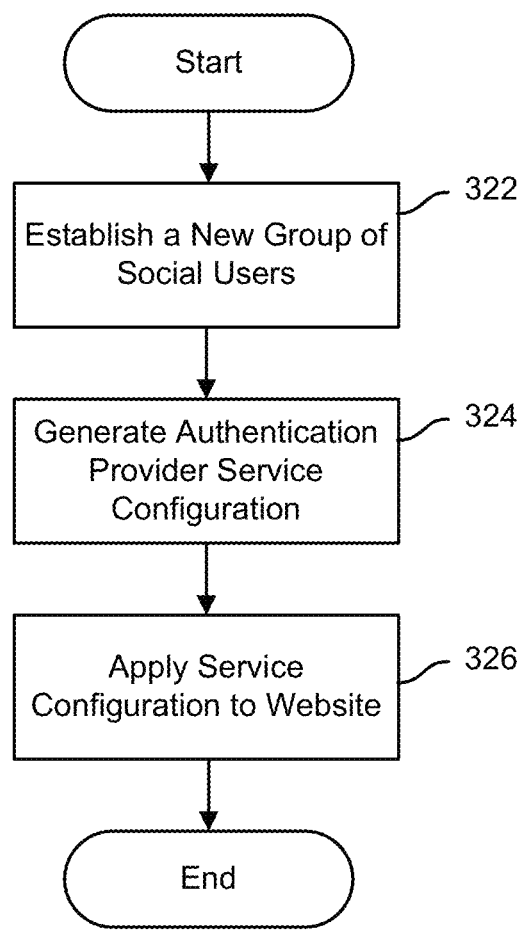
FIG. 3C is a flow diagram illustrating an embodiment of a process for configuring a website to use an authentication provider for logging into the website.

FIG. 3C is a flow diagram illustrating an embodiment of a process for configuring an Adobe CQ website to use an authentication provider for logging into the website. In some embodiments, process 320 is used to implement process step 304 of FIG. 3B. The process begins at 322 when a group of users is established. In various embodiments, existing user groups (e.g., CQ user group) can be leveraged or a new user group can be created specifically for users. For example, Facebook® users and Twitter® users can be included in a group called "fbusers" or "Twitter® users," respectively, or can be included in a general social users group.

At 324, a service configuration associated with an authentication provider is generated. The service configuration is set up by an administrator of an Adobe CQ system to enable authentication with a particular authentication provider for which an application has been created. The service configuration includes the details of the application created (e.g., by receiving identifiers such as keys, IDs, and secrets, for an authentication provider), permissions requested (i.e., authorized resources), and the CQ user group to be used for new users who login via the authentication provider. The permissions requested can include basic permissions as well as additional extended permissions that can be specified by the authentication provider as options. Each authentication provider can have a unique and special set of permissions that specifically relate to their digital identity platform.

At 326, a service configuration is applied to a portion of an Adobe CQ website. As described in the example above, if an Adobe CQ website such as Geometrixx Outdoors included French, German, and Italian portions of the website, different credentials and resources could be requested from Facebook® for the French and German site than the Italian site, which would be automatically/dynamically configured and specified by using specialized service configurations/settings while minimizing specialized code development. In some embodiments, portions of the website can also be associated with different authentication providers via service configurations so that a user can use various authentication providers for logging into the website.

Figure 4:
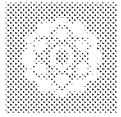
FIG. 4 is a diagram illustrating an embodiment of an interface for generating a Facebook® application.

FIG. 4 is a diagram illustrating an embodiment of an interface for generating a Facebook® application. In the example shown, an App ID and App Secret (402) are provided for accessing Facebook®. At 404, the website utilizing Facebook® login (e.g., Geometrixx Outdoors) is entered.

Figure 5:
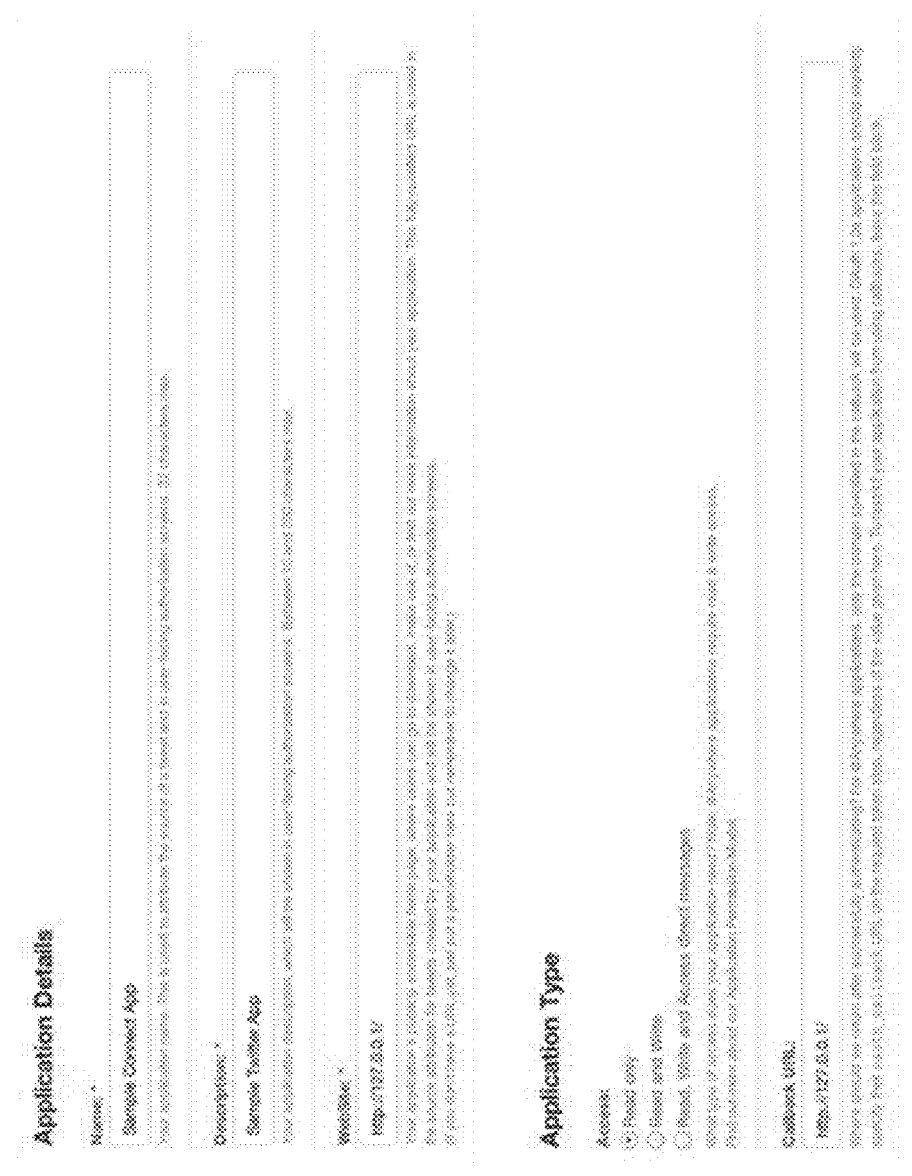

FIG. 5 is a diagram illustrating an embodiment of an interface for generating a Twitter® application.

Figure 6:
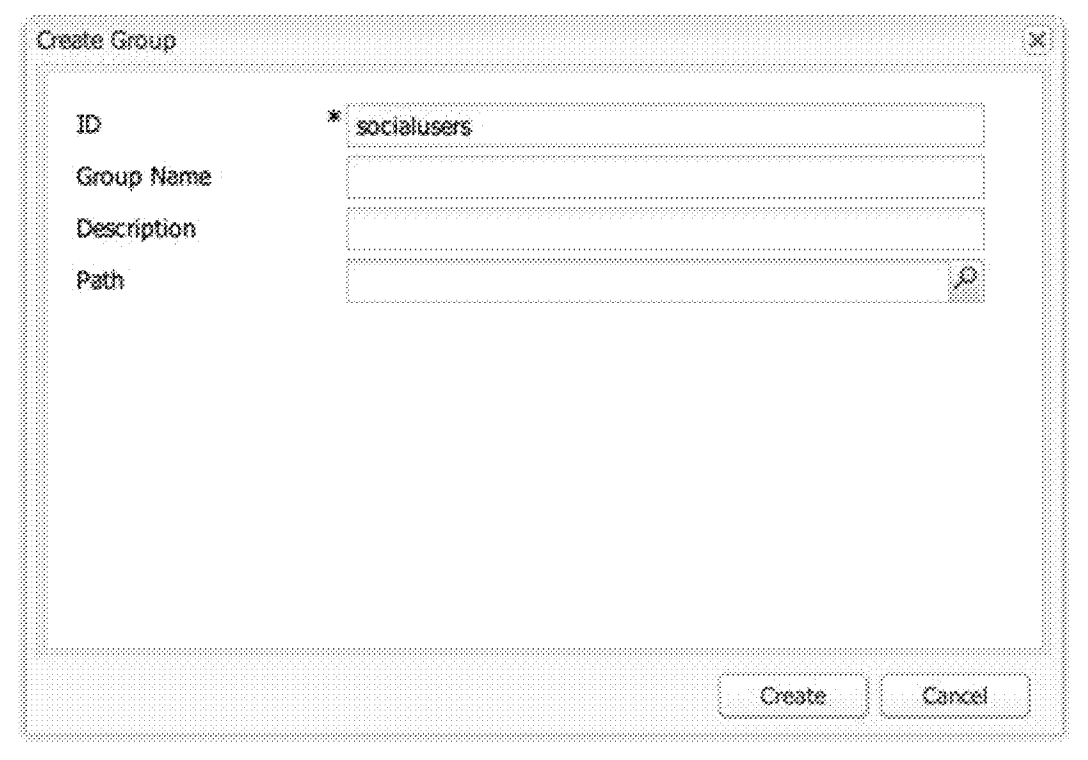

FIG. 6 is a diagram illustrating an embodiment of an interface for establishing a new group for social users (e.g., new CQ User Group for general "socialusers" including Facebook®, Twitter®, Linkedin® users, etc.).

Figure 7A:
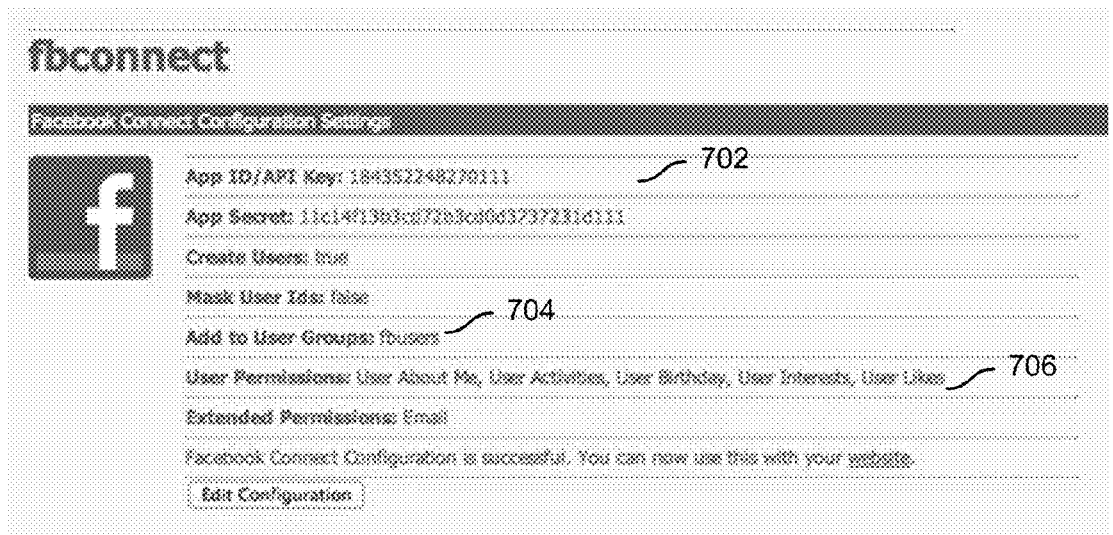
FIG. 7A is a diagram illustrating an embodiment of an interface for creating a Facebook® cloud service configuration.

FIG. 7A is a diagram illustrating an embodiment of an interface for creating a Facebook® cloud service configuration. In the example shown, the App ID and Secret provided when generating the Facebook® Application are entered into the Facebook® service configuration. "fbusers" (704) is an example user group (e.g., CQ user group) that authenticated users who login via Facebook® are added to. As described above, the group can be an existing group or a new group that was established via the interface as shown in FIG. 6. Example user permissions (e.g., basic or default permissions) such as "user about me, user activities, user birthday, user interests, user likes, etc." are shown at 706. Extended permissions are also shown, which may be further requested from a user upon login.

Figure 7B:
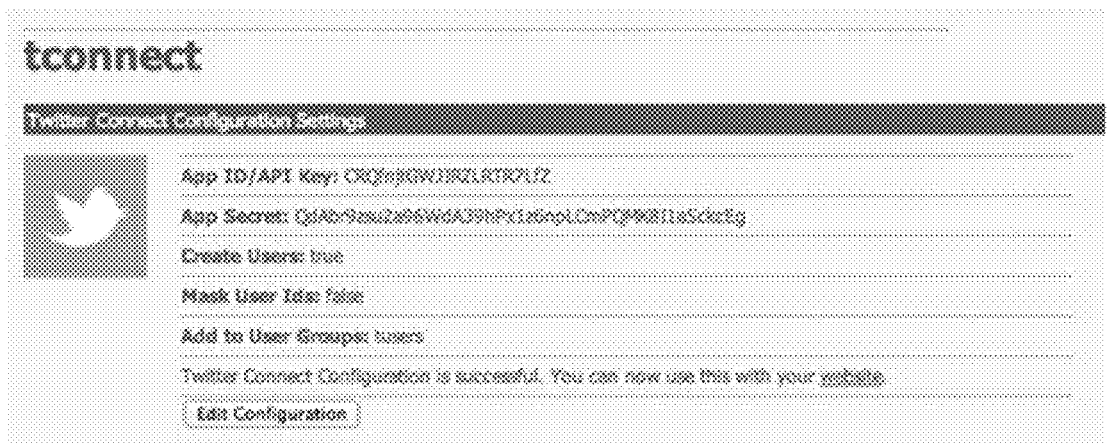
FIG. 7B is a diagram illustrating an embodiment of an interface for creating a Twitter® cloud service configuration.
Figure 8:
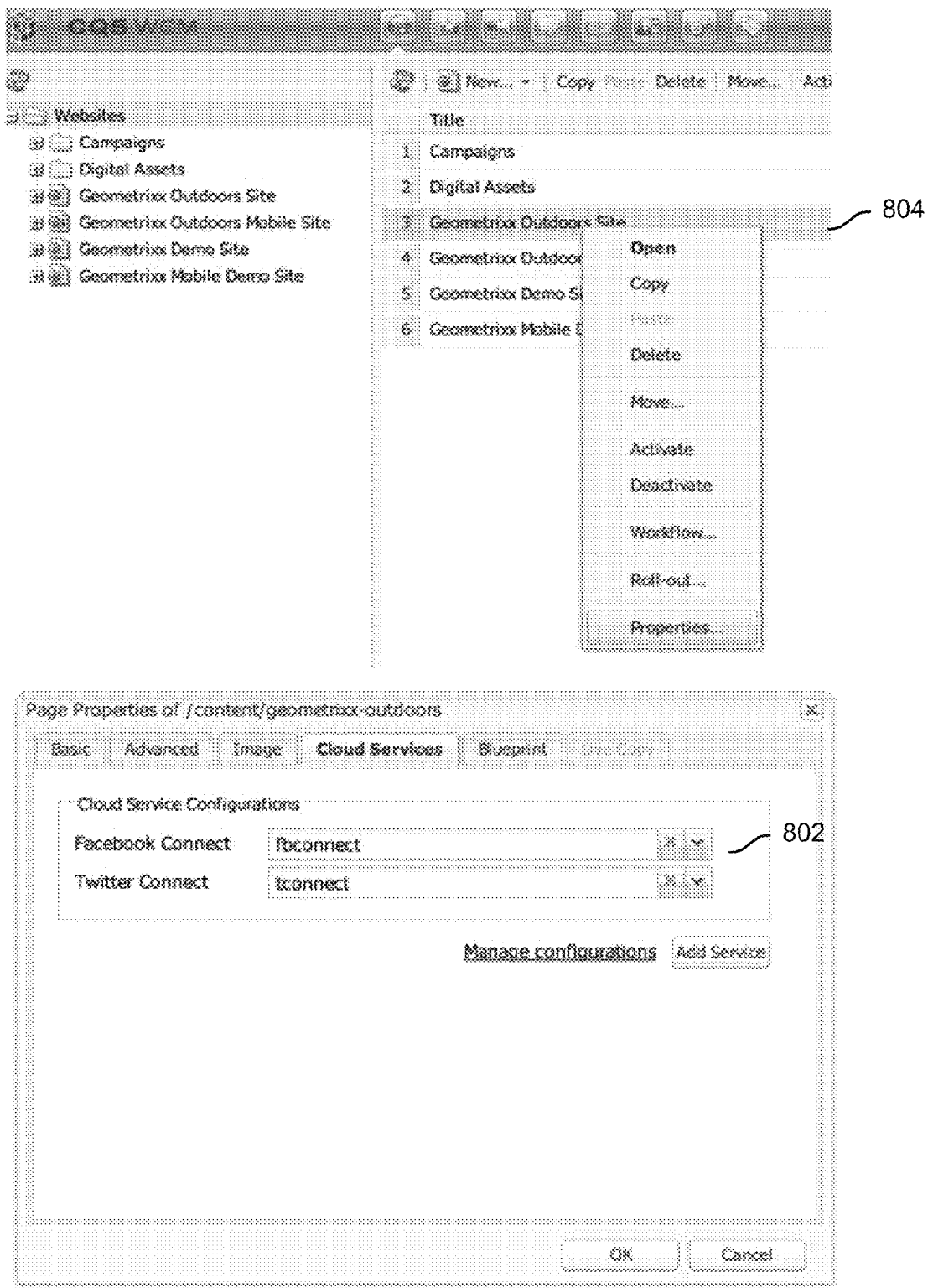
FIG. 8 is a diagram illustrating an embodiment of an interface for applying cloud service configurations to a website.

FIG. 7B is a diagram illustrating an embodiment of an interface for creating a Twitter® cloud service configuration FIG. 8 is a diagram illustrating an embodiment of an interface for applying cloud service configurations to a website. In the example shown, Facebook® Connect and Twitter® Connect cloud service configurations (802) are applied to the Geometrixx Outdoors Site (804) via the interface. Service configurations (with potentially different settings) can also be applied to other portions of the Adobe CQ website, such as the Geometrixx Outdoors mobile site.

Figure 9:
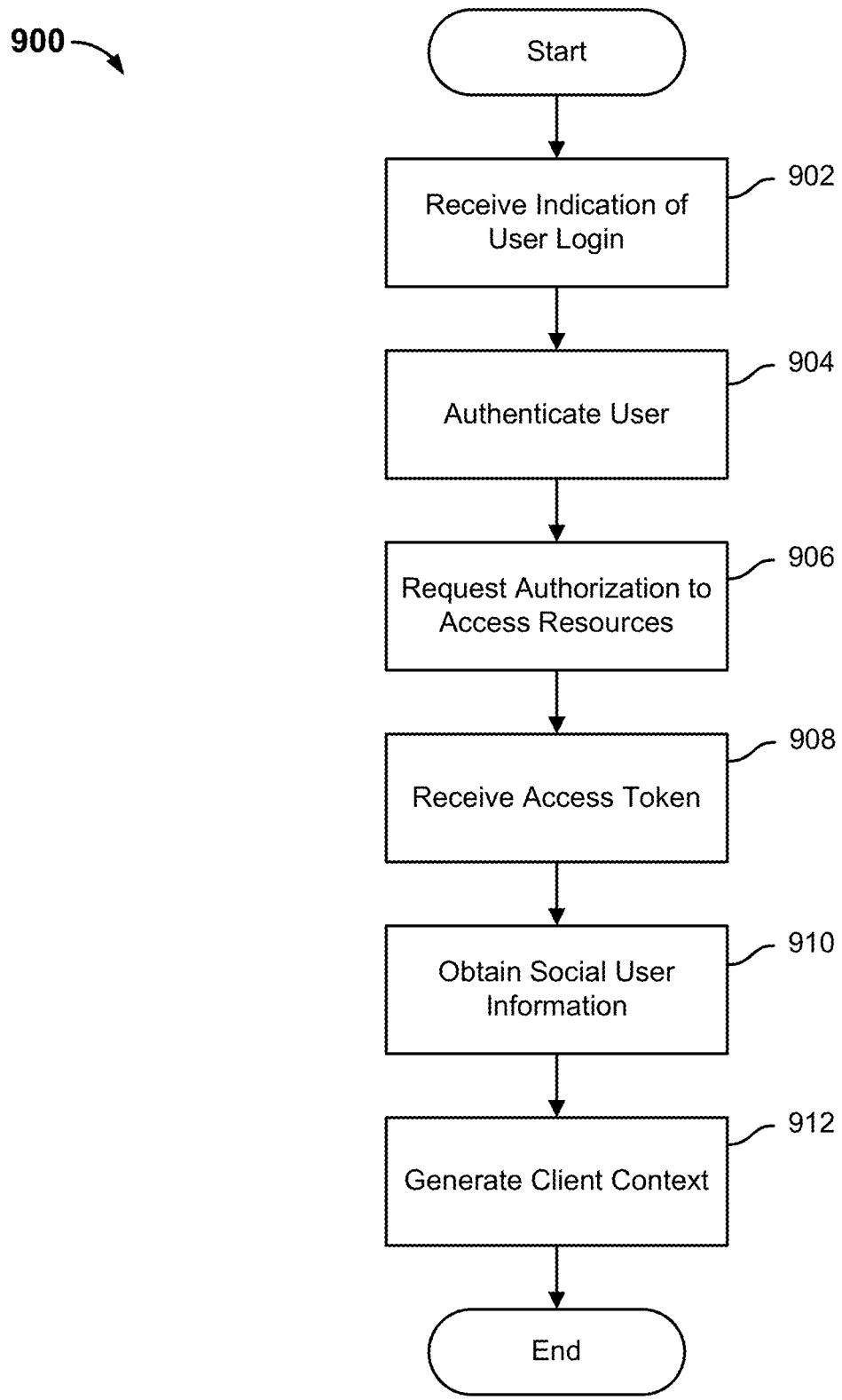
FIG. 9 is a flow diagram illustrating an embodiment of a process for generating a client context.

FIG. 9 is a flow diagram illustrating an embodiment of a process for generating a client context. In some embodiments, process 900 is executed by client context engine 214 of FIG. 2. The process begins at 902 when an indication of a login to a digital identity platform by a user is received (e.g., user has logged into Geometrixx Outdoors via their existing Facebook® or Twitter® digital identity).

At 904, the user is authenticated. The user can be authenticated via authentication configuration engine 202 of FIG. 2.

At 906, authorization to access resources is requested. In some embodiments, if the user is a new user, they are prompted to indicate what resources the Adobe CQ website is authorized to access and obtain from an external digital identity platform. In some embodiments, the resources requested are specified in a previously generated application service configuration (e.g., basic/extended permissions (706) of FIG. 7A).

At 908, an access token is received from an authentication provider/digital identity platform. The access token can be associated with a set of access permissions indicating the resources to which authorization has been granted (e.g., Facebook® likes, friends, interests, Twitter® followers, hash tags, etc.).

At 910, user information is obtained. In some embodiments, user information is obtained from an authentication provider via the access token provided by the authentication provider. In some embodiments, user information is obtained via a graph API associated with an authentication provider (e.g., Facebook® social graph API). In some embodiments, the obtained user information/social profile data is stored with a user profile (e.g., Adobe CQ user profile). In some embodiments, the obtained user information/social profile data can be configured/specified to be stored using tags that can be stored in a tagging infrastructure. For example, "likes" and "interests" obtained from a user's Facebook® profile can be tagged and stored in a central Adobe CQ tagging infrastructure. Tags can then be taken advantage of and used throughout the Adobe CQ environment (e.g., by marketing campaign management component or any other appropriate CQ component) to determine what content should be targeted upon. Social profile data can be assigned to a particular tag and reused. For example, if a tag for "UC Berkeley" was previously stored in the tagging infrastructure, in the event that a new user logged in via Facebook® and was indicated to go to "UC Berkeley," a new tag would not have to be created, and the profile of the user can be associated with the existing "UC Berkeley" tag. Information obtained for different digital identity platforms can also be grouped in various ways. For example, all tags generated from Facebook® and Twitter® information can be grouped into a single "social tags" bucket, with duplicates removed as needed, or the tags may remain separate and distinct from each other (e.g., one location for Facebook® tags, separate location for Twitter® tags). The grouping of information obtained for different digital identity platforms can be specified/implemented via authentication handler 208.

At 912, a client context for the user is generated. In some embodiments, the client context includes a user profile generated using data (e.g., social profile data) obtained from external digital identity platforms. The user profile can be configured to display social profile data (e.g., age, favorite quote, books, likes, interests). The social profile data can be applied to the client context automatically or by an administrator of the Adobe CQ system. Tags can also be applied to the client context. As described above, the client context can reside in a browser of the Adobe CQ website visitor, with an Adobe CQ user profile for the visitor also stored on the side of the Adobe CQ system. Personalized content can be provided to the visitor based on their client context and user profile. In some embodiments, profile simulation can be performed for testing purposes by configuring a client context in different ways and loading and simulating a client context user profile on any page (e.g., in a web experience management system on an Adobe CQ system) to see what content will be provided to them.

Figure 10:
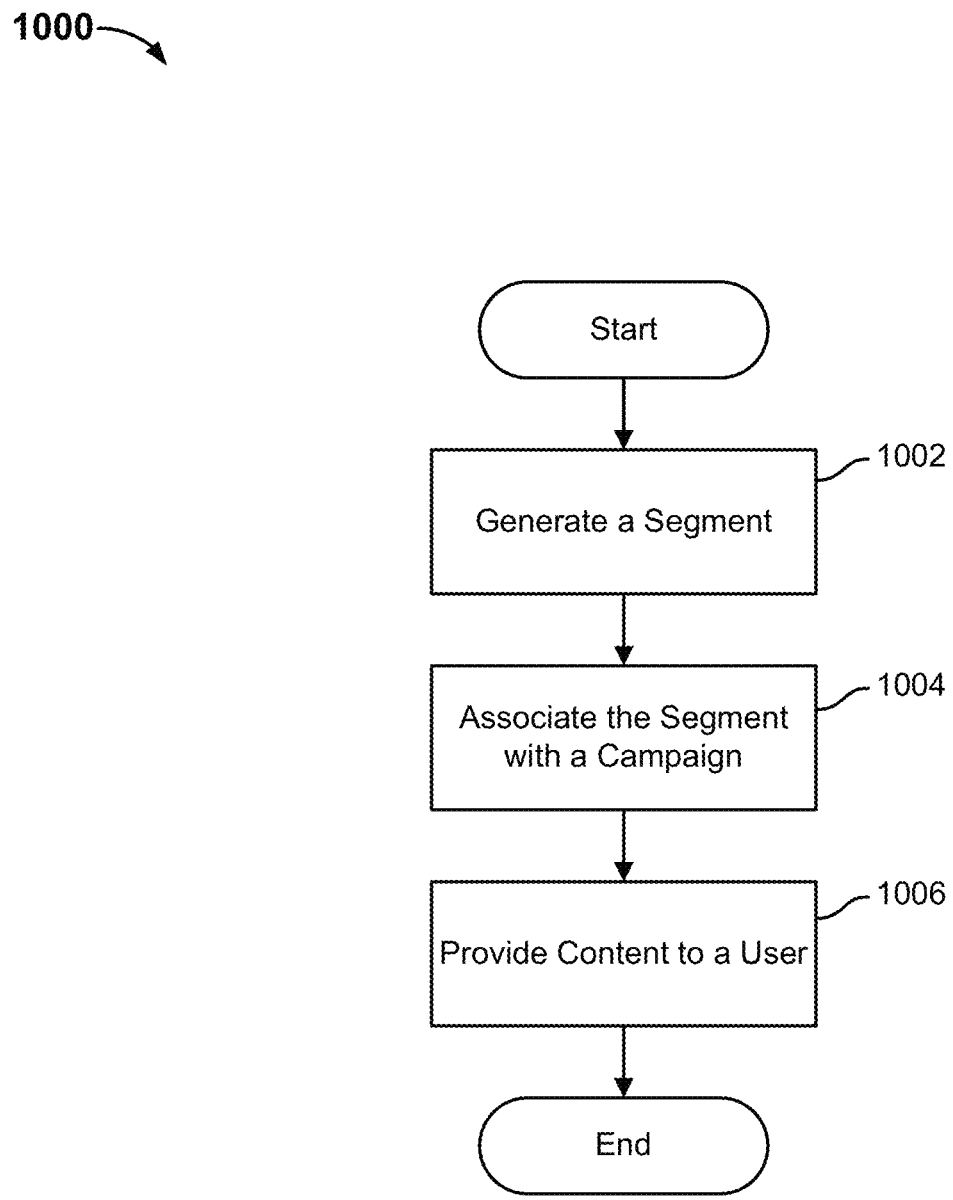
FIG. 10 is a flow diagram illustrating an embodiment of a process for generating segments and providing content to a website visitor.

FIG. 10 is a flow diagram illustrating an embodiment of a process for generating segments and providing content to a Adobe CQ website visitor. In some embodiments, process 1000 is executed by rule/segment engine 216 and marketing campaign management engine 206 of FIG. 2. The process begins at 1002 when a segment is generated. As described above, in some embodiments, a segment is a collection of rules and traits that can be used for targeted market campaigns. In various embodiments, generating a segment includes entering a title for the new segment (e.g., "Snowboarders") and configuring properties of the segment, which can be based on obtained social profile data specifying particular rules or traits of interest. For example, the "Snowboarders" segment can be configured to include traits/rules such as "Facebook® interest=snowboarding," "Favorite Athlete=Shaun White," etc.

At 1004, a segment is associated with a campaign. For example, because the winter season is approaching, a digital marketer associated with Geometrixx Outdoors can decide to begin a new marketing campaign associated with winter sports. In creating the new marketing campaign, the digital marketer can create various teasers or banners associated with snowboarding, skiing, etc. In order to provide the appropriate and relevant teaser to a visitor of Geometrixx Outdoors, the digital marketer can associate the snowboarding campaign teaser with the snowboarding segment generated above.

At 1006, content is provided to an Adobe CQ website visitor. Using the segments and campaigns described above, authenticated visitors of an Adobe CQ website can be targeted and provided relevant content based on obtained social profile data and their client context (i.e., provide a customized website tailored with respect to, or dynamically displayed/rendered in the context of the visitor). For example, an authenticated visitor whose Facebook® profile information matches a snowboarding segment can be displayed/rendered a snowboarding teaser upon logging into the Geometrixx Outdoors website using their Facebook® credentials.

In some embodiments an administrator can simulate how the website would be rendered in the context of various users and can view the social profile data for a specific user by configuring an existing client context by adding various social components (e.g., Facebook® interests, demographics, etc.) and then specifically loading the stored user's profile into the client context for the simulation and testing of various campaign segments and traits.

Figure 11:
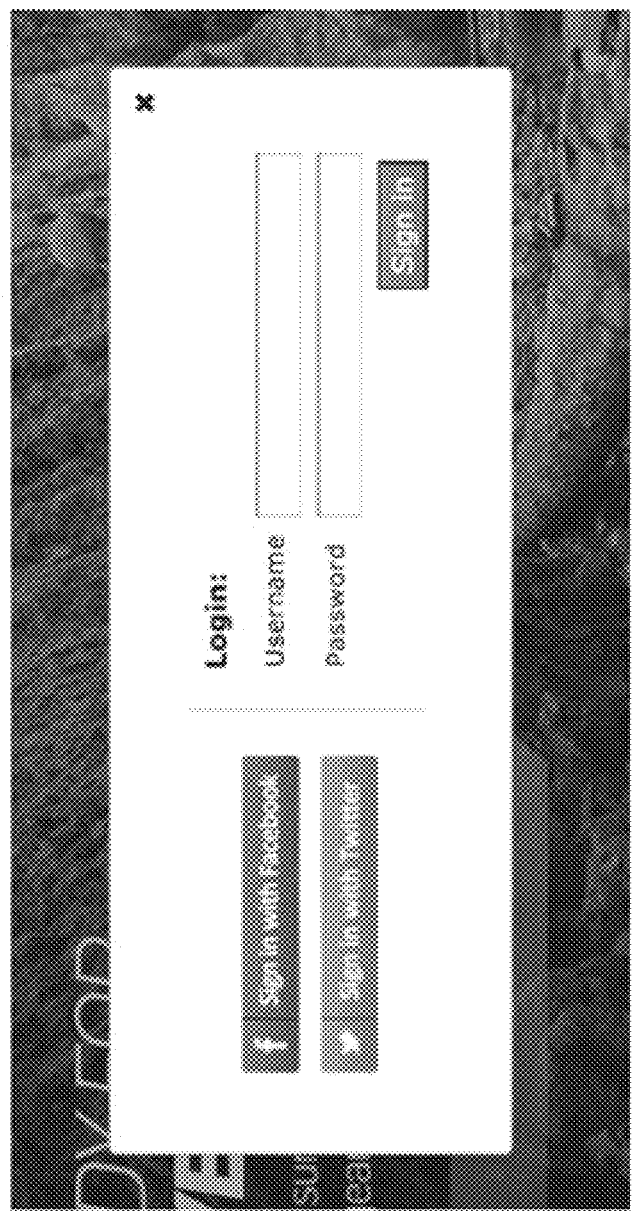
FIG. 11 is a diagram illustrating an embodiment of an interface for logging into an Adobe CQ website using existing digital identities.

FIG. 11 is a diagram illustrating an embodiment of an interface for logging in to an Adobe CQ website using existing digital identities. In the example shown, the visitor can login with one or more of their Facebook® digital identity, Twitter® identity, or Geometrixx Outdoors identity (e.g., if Adobe CQ website has internal mechanism for authentication/credentials). In some embodiments, the user is presented with additional prompts requesting authorization to resources (e.g., likes, favorites, interests, friends, etc.). In some embodiments, a first prompt for basic permissions is displayed to a user, and a second prompt that includes extended permissions is presented to a user. In some embodiments, the request for authorization to access resources is presented the first time a user has logged onto an Adobe CQ website. In some embodiments, a user profile is not stored in the event that a user does not complete the login procedure or only partially completes the login procedure (e.g., cancelling login before all prompts/requests have been accepted).

Figure 12:
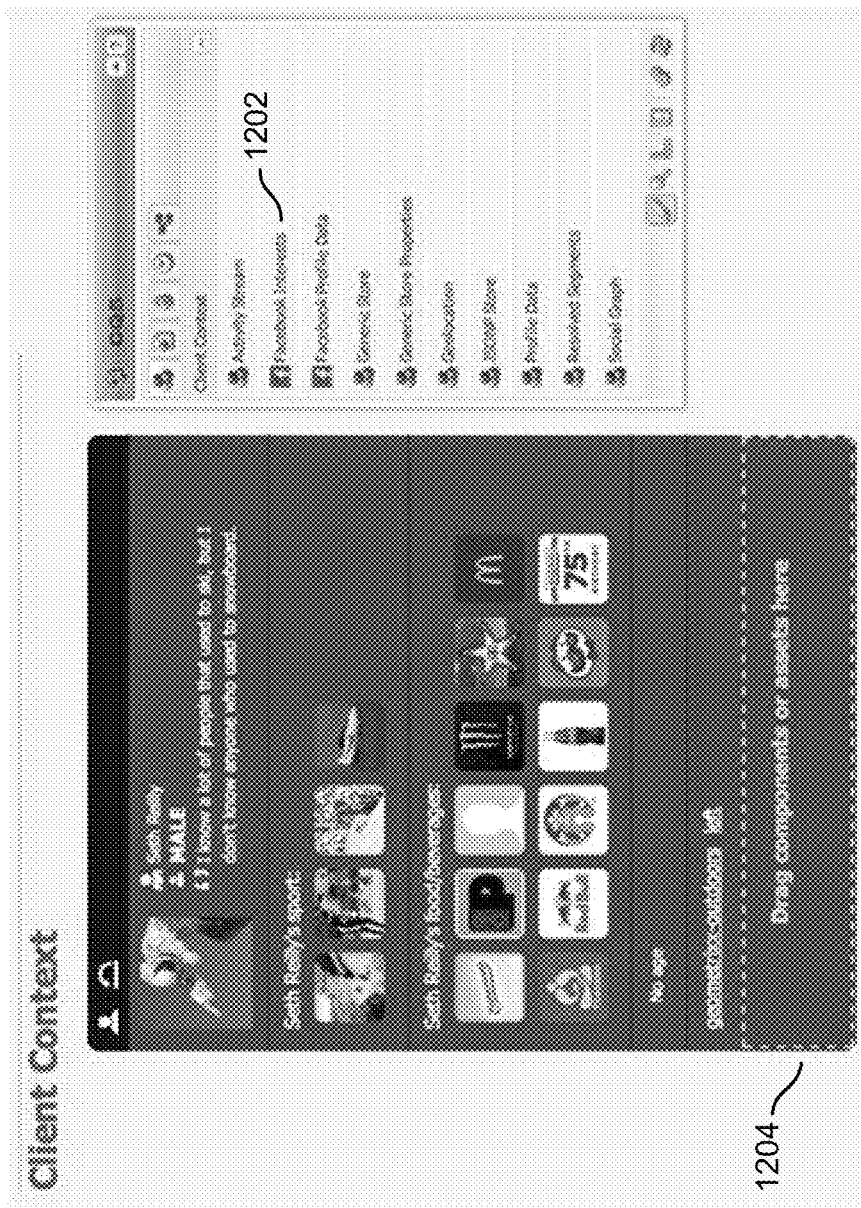
FIG. 12 is a diagram illustrating an embodiment of an interface for configuring a client context to display social profile data.

FIG. 12 is a diagram illustrating an embodiment of an interface for configuring a client context to display social profile data. In the example shown, various user information and social profile data display components can be added to the client context. For example, in the interface shown, Facebook® Interests component (1202) can also be added to the client context via drag and drop (1204). Other social profile data components can also be added to the client context at the same time.

Figure 13:
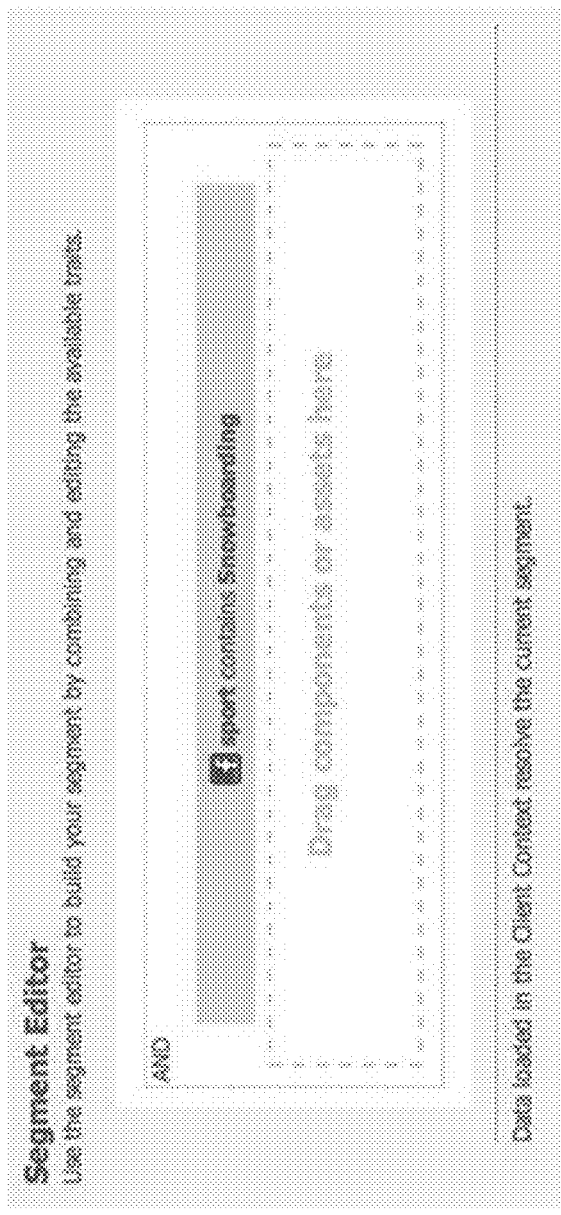
FIG. 13 is a diagram illustrating an embodiment of an interface for configuring a segment.

FIG. 13 is a diagram illustrating an embodiment of an interface for configuring a segment. In the example shown, a segment for snowboarding is being generated. Various rules/traits can be selected to define the segment. For example, traits associated with Facebook® interests (e.g., interest=snowboarding) can be added to the segment.

Figure 14:
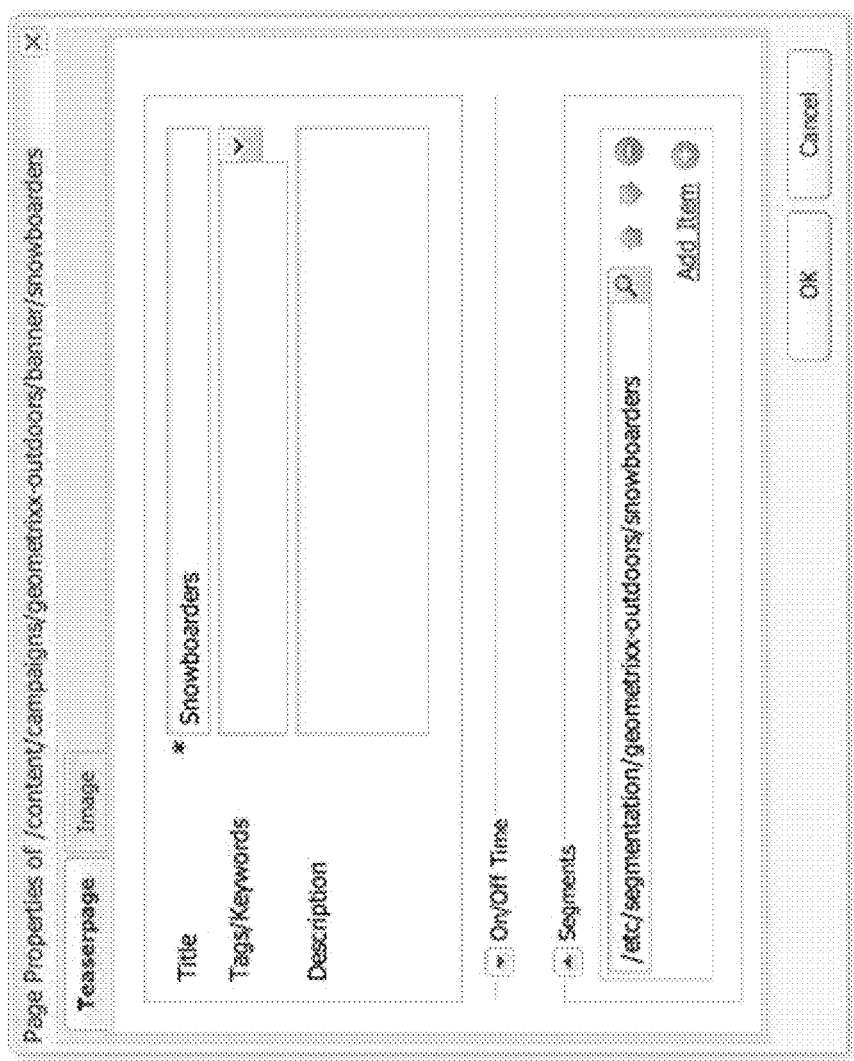
FIG. 14 is a diagram illustrating an embodiment of an interface for creating a teaser.

FIG. 14 is a diagram illustrating an embodiment of an interface for creating a teaser. In the example shown, the teaser leverages segments (1402) and social profile data. The teaser can be associated with a marketing campaign, managed by, for example, the marketing campaign management component of an Adobe CQ system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method comprising:
receiving, at a web server, a request to login to a web page of a web site that is hosted by the web server, the request comprising a user login identity for logging a user into the web page, the user login identity authenticating the user based on a separate account managed by an authentication provider different from the web server, the web site comprising a plurality of web pages configured to be logged into based on a plurality of user login identities;
contacting, at the web server, the authentication provider to authenticate the user login identity;
contacting, at the web server, the authentication provider to identify social profile data that is associated with the separate account, the social profile data comprising an interest that is associated with the separate account;
identifying, at the web server, personalized content from potential content based on the interest by at least:
generating, at the web server, a user profile based on the social profile data, the user profile comprising a tag received from the social profile data and indicating the interest;
storing the user profile locally at the web server;
matching, at the web server, the tag of the user profile to a common tag of a group of user profiles, the group of user profiles associated with other users, generated from a set of social profile data of the other users, and stored locally at the web server, the set of social profile data comprising tags associated with the other users, the user profiles grouped in the group based on the common tag identified from the tags; and
selecting, at the web server, the personalized content based on matching the tag to the common tag such that the personalized content is associated with the group of user profiles and such that, when logging the user into another web page of the plurality of web pages based on another user login identity of the plurality of user login identities, the other web page is personalized differently from the web page by selecting dif- ferent personalized content from the potential content based on the other user login identity and the user profile;

permitting, at the web server, the login to the web page based on the authentication provider authenticating the user login identity; and providing, at the web server, the personalized content as part of the web page of the web site hosted by the web server.

2. The method of claim 1 further comprising:
receiving user profile data associated with the user login identity from the authentication server; and
identifying additional personalized content based on the user profile data received.

3. The method of claim 2, wherein identifying additional personalized content comprises:
identifying a trait based on the user profile data received; and
selecting a group of potential advertisements associated with the trait identified.

4. The method of claim 1, further comprising:
receiving a permission to a resource associated with the user login identity from the authentication provider; and
accessing the resource using the permission received.

5. The method of claim 1, wherein the personalized content comprises a teaser, a newsletter, an advertisement, a customized web page, or an e-mail communication to be displayed on the web page provided.

6. The method of claim 1, further comprising:
identifying rules and conditions for selecting the personalized content based on the user profile; and
causing a computing device of the user to store the user profile, the rules and conditions, and the tag in a user context at a browser of the computing device, and wherein identifying the personalized content comprises:
accessing the user context from the computing device of the user;
matching the user context to the group of user profiles based on the tag stored in the context; and
selecting the personalized content based on the matching of the user context to the group of user profiles and based on determining that the rules and conditions stored in the context permit the selection of the personalized content.

7. The method of claim 6, wherein the user profile is generated based on sets of social profile data that are received from a plurality of authentication providers and that correspond to a plurality of user login identities of the user.

8. The method of claim 6, wherein the web site is configured to control using the separate account to log into each web page based on each web page and user login identity.

9. The method of claim 1, wherein logging the user into the web page comprises receiving a particular set of user profile data from the authentication provider specific to the web page, wherein logging the user into the other web page comprises receiving another particular set of user profile data from the authentication provider specific to the other web page, and wherein each of the two web pages is personalized based on the respective particular set of user profile data.

10. The method of claim 1, wherein the web site is hosted on a web authoring platform, wherein the web authoring platform is configured to provide an authentication engine and a social connect engine, wherein the authentication engine is configured to communicate with authentication providers to authenticate the user based on user login identities, and wherein the social connect engine is configured to personalize the web page.

11. The method of claim 10, wherein the authentication engine and the social connect engine are provided to the web site as one or more pluggable services, wherein the one or more pluggable services are configured to at least:
set-up authentications users with the authentication provider based on generating an application associated with the authentication provider and, in response to generating the application, receiving an application identifier and a secret from the authentication provider;
generate a service at the web authoring platform based on the application, the service having a configuration comprising the application identifier and the secret; and
authenticate the user by using the service to at least provide the user login identity, the application identifier, and the secret to the authentication provider.

12. A computer program product comprising a non-transitory computer-readable medium embodying program instructions, the program instructions comprising:
program instructions for receiving, at a web server, a request to login to a web page of a web site that is hosted by the web server, the request comprising a user login identity for logging a user into the web page, the user login identity authenticating the user based on a separate account managed by an authentication provider different from the web server, the web site comprising a plurality of web pages configured to be logged into based on a plurality of user login identities;
program instructions for contacting, at the web server, the authentication provider to authenticate the user login identity;
program instructions for contacting, at the web server, the authentication provider to identify social profile data that is associated with the separate account, the social profile data comprising an interest that is associated with the separate account;
program instructions for identifying, at the web server, personalized content from potential content based on the interest by at least:
generating, at the web server, a user profile based on the social profile data, the user profile comprising a tag received from the social profile data and indicating the interest;
storing the user profile locally at the web server;
matching, at the web server, the tag of the user profile to a common tag of a group of user profiles, the group of user profiles associated with other users, generated from a set of social profile data of the other users, and stored locally at the web server, the set of social profile data comprising tags associated with the other users, the user profiles grouped in the group based on the common tag identified from the tags; and
selecting, at the web server, the personalized content based on matching the tag to the common tag such that the personalized content is associated with the group of user profiles and such that, when logging the user into another web page of the plurality of web pages based on another user login identity of the plurality of user login identities, the other web page is personalized differently from the web page by selecting different personalized content from the potential content based on the other user login identity and the user profile;
program instructions for permitting, at the web server, the login to the web page based on the authentication provider authenticating the user login identity; and program instructions for providing, at the web server, the personalized content as part of the web page of the web site hosted by the web server.

13. The computer program product of claim 12, further comprising:
   program instructions for receiving user profile data associated with the user login identity from the authentication server; and
   program instructions for identifying additional personalized content based on the user profile data received.

14. The computer program product of claim 13, wherein program instructions identifying additional personalized content comprises:
   program instructions for identifying a trait based on the user profile data received; and
   program instructions for selecting a group of potential advertisements associated with the trait identified.

15. The computer program product of claim 12, further comprising:
   program instructions for receiving a permission to a resource associated with the user login identity from the authentication server; and
   program instructions for accessing the resource using the permission received.

16. The computer program product of claim 12, wherein the personalized content comprises a teaser, a newsletter, an advertisement, a customized web page, or an e-mail communication to be displayed on the web page provided.

17. A system of a web server comprising a processor and a non-transitory computer-readable medium, wherein the non-transitory computer-readable medium embodies one or more program components that configure the web server to carry out operations comprising:
   receiving a request to login to a web page of a web site that is hosted by the web server, the request comprising a user login identity for logging a user into the web page, the user login identity authenticating the user based on a separate account managed by an authentication provider different from the web server, the web site comprising a plurality of web pages configured to be logged into based on a plurality of user login identities;
   contacting the authentication provider to authenticate the user login identity;
   contacting the authentication provider to identify social profile data that is associated with the separate account, the social profile data comprising an interest that is associated with the separate account;
   identifying personalized content from potential content based on the interest by at least:
      generating a user profile based on the social profile data, the user profile comprising a tag received from the social profile data and indicating the interest;
      storing the user profile locally at the web server;
      matching the tag of the user profile to a common tag of a group of user profiles, the group of user profiles associated with other users, generated from a set of social profile data of the other users, and stored locally at the web server, the set of social profile data comprising tags associated with the other users, the user profiles grouped in the group based on the common tag identified from the tags;
      selecting the personalized content based on matching the tag to the common tag such that the personalized content is associated with the group of user profiles and such that, when logging the user into another web page of the plurality of web pages based on another user login identity of the plurality of user login identities, the other web page is personalized differently from the web page by selecting different personalized content from the potential content based on the other user login identity and the user profile;
   permitting the login to the web page based on the authentication provider authenticating the user login identity; and
   providing the personalized content as part of the web page of the web site hosted by the web server.

18. The system of claim 17, wherein identifying personalized content comprises:
   matching the interest associated with the user login identity to a label identifying advertisements targeted to the matched interest.

19. The system of claim 17, wherein identifying personalized content comprises:
   selecting a group of potential advertisements matching the interests associated with the user login identity.

20. The system of claim 17, wherein identifying personalized content comprises:
   identifying a user group for the user login identity based on the interest associated with the user login identity; and
   selecting a group of advertisements targeted to the user group.

* * * * *